(12) United States Patent
Van Bodegraven et al.

(10) Patent No.: US 12,133,306 B2
(45) Date of Patent: Oct. 29, 2024

(54) LAMP DRIVER WITH OVER VOLTAGE PROTECTION

(71) Applicant: SIGNIFY HOLDING B.V., Eindhoven (NL)

(72) Inventors: Tijmen Cornelis Van Bodegraven, Eindhoven (NL); Reinhold Elferich, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 71 days.

(21) Appl. No.: 17/919,544

(22) PCT Filed: Apr. 22, 2021

(86) PCT No.: PCT/EP2021/060492
§ 371 (c)(1),
(2) Date: Oct. 18, 2022

(87) PCT Pub. No.: WO2021/219477
PCT Pub. Date: Nov. 4, 2021

(65) Prior Publication Data
US 2023/0164898 A1    May 25, 2023

(30) Foreign Application Priority Data
Apr. 28, 2020  (EP) ..................... 20171738

(51) Int. Cl.
*H05B 45/30* (2020.01)
*H05B 45/382* (2020.01)
*H05B 45/50* (2022.01)
*H05B 47/24* (2020.01)

(52) U.S. Cl.
CPC ........... *H05B 45/50* (2020.01); *H05B 45/382* (2020.01); *H05B 47/24* (2020.01)

(58) Field of Classification Search
CPC ...... H05B 45/30; H05B 45/305; H05B 45/32; H05B 45/325; H05B 45/34; H05B 45/345; H05B 45/382; H05B 45/50; H05B 47/10; H05B 47/24
See application file for complete search history.

(56) References Cited

U.S. PATENT DOCUMENTS

| 2013/0043792 | A1  | 2/2013  | Reed |
| 2013/0264961 | A1* | 10/2013 | Chang ................ H04B 10/802 |
|              |     |         | 315/201 |
| 2017/0149325 | A1  | 5/2017  | Lau et al. |
| 2022/0191997 | A1* | 6/2022  | Clauberg ............. H05B 45/14 |

FOREIGN PATENT DOCUMENTS

| CN | 101801136 A  | * | 8/2010  |
| CN | 106026712 A  | * | 10/2016 |
| DE | 102014105013 A1 |   | 10/2014 |

* cited by examiner

Primary Examiner — Jimmy T Vu

(57) ABSTRACT

A lamp driver delivers an output voltage and output current to a lamp load. A current regulating circuit at a secondary side provides a feedback signal for use by the driver when in a current regulation mode. An overvoltage protection circuit detects an overvoltage condition of an output voltage and modulates the feedback signal during detection of the overvoltage condition. The overvoltage condition can then be recognized more easily based on the resulting modulation of the output voltage.

20 Claims, 3 Drawing Sheets

LAMP DRIVER WITH OVER VOLTAGE PROTECTION

CROSS-REFERENCE TO PRIOR APPLICATIONS

This application is the U.S. National Phase application under 35 U.S.C. § 371 of International Application No. PCT/EP2021/060492, filed on Apr. 22, 2021, which claims the benefit of European Patent Application No. 20171738.6, filed on Apr. 28, 2020. These applications are hereby incorporated by reference herein.

FIELD OF THE INVENTION

The invention relates to lamp drivers with overvoltage protection, for example for use when a regulated current is delivered to the lamp.

BACKGROUND OF THE INVENTION

LEDs are increasingly the dominant light technology in domestic as well as commercial applications.

LEDs are current-driven devices, and hence LED drivers are often designed to provide a regulated output current. However, if a driver attempts to deliver a regulated current to an open circuit (e.g. with no LED arrangement connected, or with an open circuit failure mode), the voltage will rise to unacceptable levels.

It is therefore known to implement an overvoltage protection function. For example, if the output voltage increases beyond a maximum level, the driver can switch to a voltage regulating mode and/or can implement a safety shut off function.

It is desirable to detect this overvoltage mode at the lamp side and provide a feedback signal reporting this condition. Indeed, for DALI drivers, there is a requirement to detect the lamp failure open load situation.

The overvoltage level, with its tolerance, and the maximum LED voltage level can be very close to each other. For example, 58V is an example of a maximum output voltage above which the overvoltage protection is activated. The voltage may be required not to exceed 60V. However, 54V may be the maximum specified output voltage, and this may in normal conditions reach 56V. This means a small voltage headroom of only around 4V is left to distinguish one operation mode from the other based on the detection of the output voltage.

This makes the detection of the activation of the overvoltage protection just by voltage sensing very difficult at the primary side of the LED driver, particularly if there is only a simple output voltage measurement in place.

LED drivers are often isolated drivers, with a primary side and a secondary side. The feedback of signals representing the output conditions from the secondary side to the primary side therefore take place using isolated feedback elements, such as optical isolators.

One option to address the problem outlined above is to employ a sufficiently precise voltage measurement at the primary side or to add another feedback interface across the isolation. However, these are relatively expensive options.

There is therefore a need to detect the difference between the voltage regulation, the so-called overvoltage protection, and the current regulation at the primary side, without significantly increasing the cost or complexity of the driver.

SUMMARY OF THE INVENTION

The invention is defined by the claims.

According to examples in accordance with an aspect of the invention, there is provided a lamp driver comprising:
a primary side circuit; and
a secondary side circuit isolated from the primary side circuit for delivering an output voltage and output current to a lamp load:
an isolating feedback unit for providing a feedback signal from the secondary side circuit to the primary side circuit:
an isolated driver circuit having a current regulation mode and a voltage regulation mode,
wherein the secondary side circuit comprises:
a current regulating circuit for providing the feedback signal based on a sensed output current, for use by the isolated driver when in the current regulation mode:
an overvoltage protection circuit for detecting an overvoltage condition of the output voltage; and
a modulator for modulating the feedback signal during detection of the overvoltage condition,
wherein the primary side circuit comprises:
a controller which is adapted to recognize the overvoltage condition based on a modulation of the output voltage during the overvoltage protection mode.

This lamp driver generates a single feedback signal which can be used for normal current regulation or for voltage control when there is an overvoltage condition, thereby implementing a voltage regulating mode. To enable the driver to distinguish more clearly at the primary side between the normal current regulation and the overvoltage protection (even though similar voltages may be present at the output) a modulation is applied to the feedback signal. This modulation takes place during the voltage control and thereby it results in a modulated output voltage. This modulation can more easily be detected at the primary side.

The modulator for example comprises an oscillator circuit. This provides a low cost circuit which can be used to generate a cyclically varying output signal.

The oscillator circuit for example comprises an operational amplifier oscillator circuit.

The overvoltage protection circuit may comprise a resistive divider connected to the output voltage and an overvoltage comparator circuit for comparing an output of the resistive divider with a reference voltage representing a maximum output voltage.

Thus, a scaled version of the output voltage is compared with a reference voltage, to determine if the output voltage has reached a maximum voltage level.

The overvoltage protection circuit may then comprise a shorting switch for selectively shorting a resistor of the resistive divider, thereby changing an input to the overvoltage comparator circuit, wherein the shorting switch is controlled by the modulator. By shorting a resistor in the resistive divider, the output voltage of the resistive divider is changed, and hence the feedback signal is altered such that the voltage regulation results in a different output voltage.

The current regulating circuit for example comprises a current sensor in the form of a sense resistor for connection in series with the lamp load, and a current regulating comparator circuit for comparing a voltage derived from the current sense resistor voltage with a reference voltage representing a target current. Thus, a deviation from a target current is provided as a feedback signal, while the overvoltage protection signal is not needed.

The overvoltage protection circuit may then be configured to adapt the feedback signal by providing a bias signal to an input of the current regulating comparator circuit. This bias signal thus disrupts the normal operation of the current feedback signal so that voltage regulation is implemented.

The isolated driver circuit for example comprises a DALI driver. The overvoltage protection circuit is for example for detecting an open circuit lamp load.

The invention also provides a lighting system comprising:
the lamp driver as defined above; and
an LED arrangement which comprises the lamp load.

This lighting system is for example incorporated in a luminaire.

The invention also provides a lamp driving method comprising:
delivering an output voltage and output current to a lamp load using a secondary side circuit:
providing a feedback signal from the secondary side circuit to a primary side circuit:
performing current regulation by providing a feedback signal from the secondary side circuit to the primary side circuit based on a sensed output current; and
detecting if there is an overvoltage condition of the output voltage and if there is an overvoltage condition modulating the feedback signal during detection of the overvoltage condition; and
recognizing the overvoltage condition at the primary side based on a modulation of the output voltage during the overvoltage protection mode.

This method enables the overvoltage condition to be recognized at the primary side even with low accuracy voltage sensing components, and with a single feedback signal.

Detecting the overvoltage condition for example comprises comparing an output of a resistive divider connected to the output voltage with a reference voltage representing a maximum output voltage, and wherein the modulating comprises selectively shorting a resistor of the resistive divider.

Performing current regulation for example comprises comparing a voltage representing the output current with a reference voltage representing a target current and wherein adapting the feedback signal comprises providing a bias signal when comparing the voltage representing the output current.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1A:
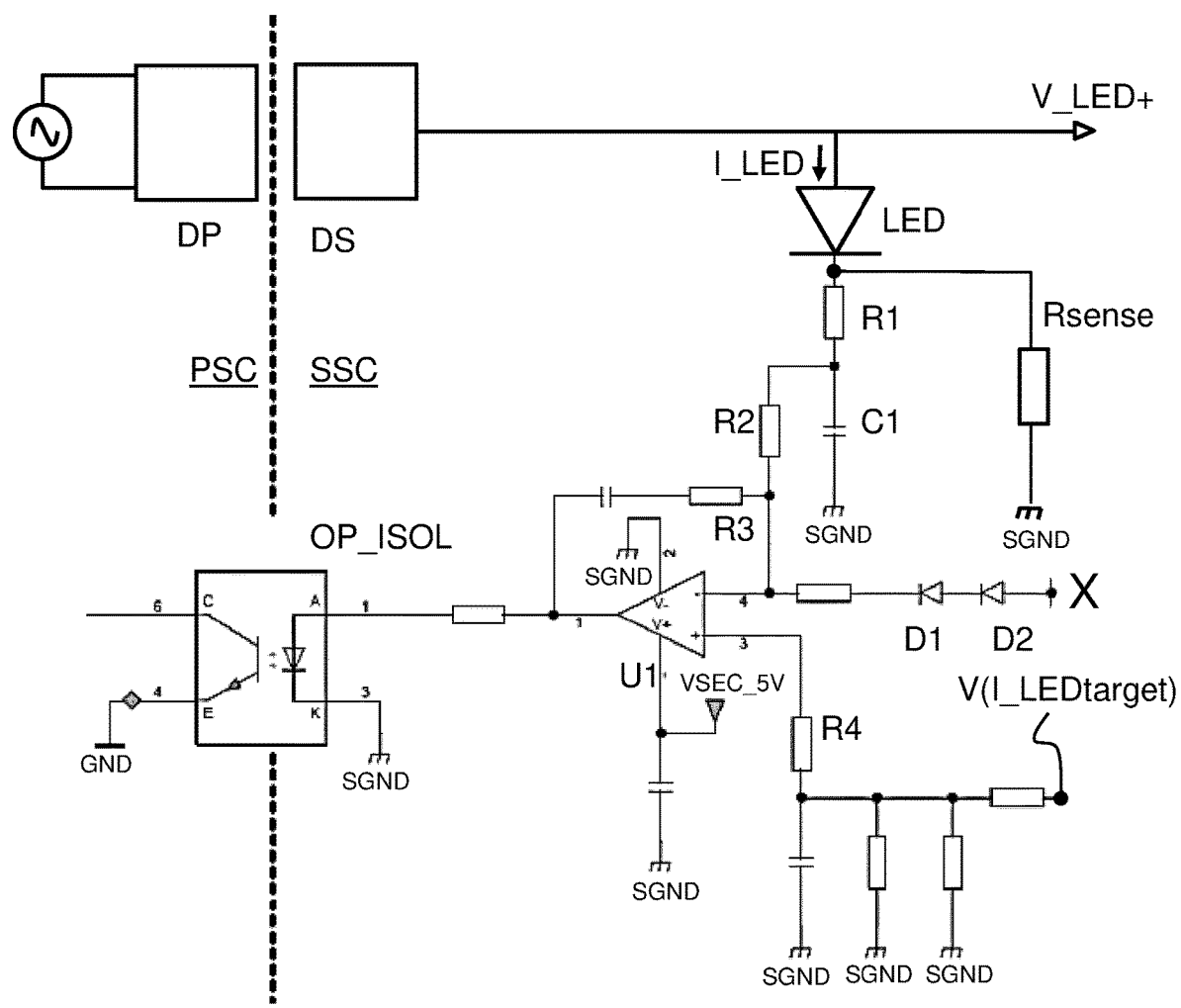
FIGS. 1A and 1B show a lighting circuit in accordance with one example of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lamp driver which delivers an output voltage and output current to a lamp load. A current regulating circuit at a secondary side provides a feedback signal for use by the driver when in a current regulation mode. An overvoltage protection circuit detects an overvoltage condition of an output voltage and modulates the feedback signal during detection of the overvoltage condition. This implemented voltage regulation. The overvoltage condition can then be recognized more easily based on the resulting modulation of the output voltage.

Figure 1B:
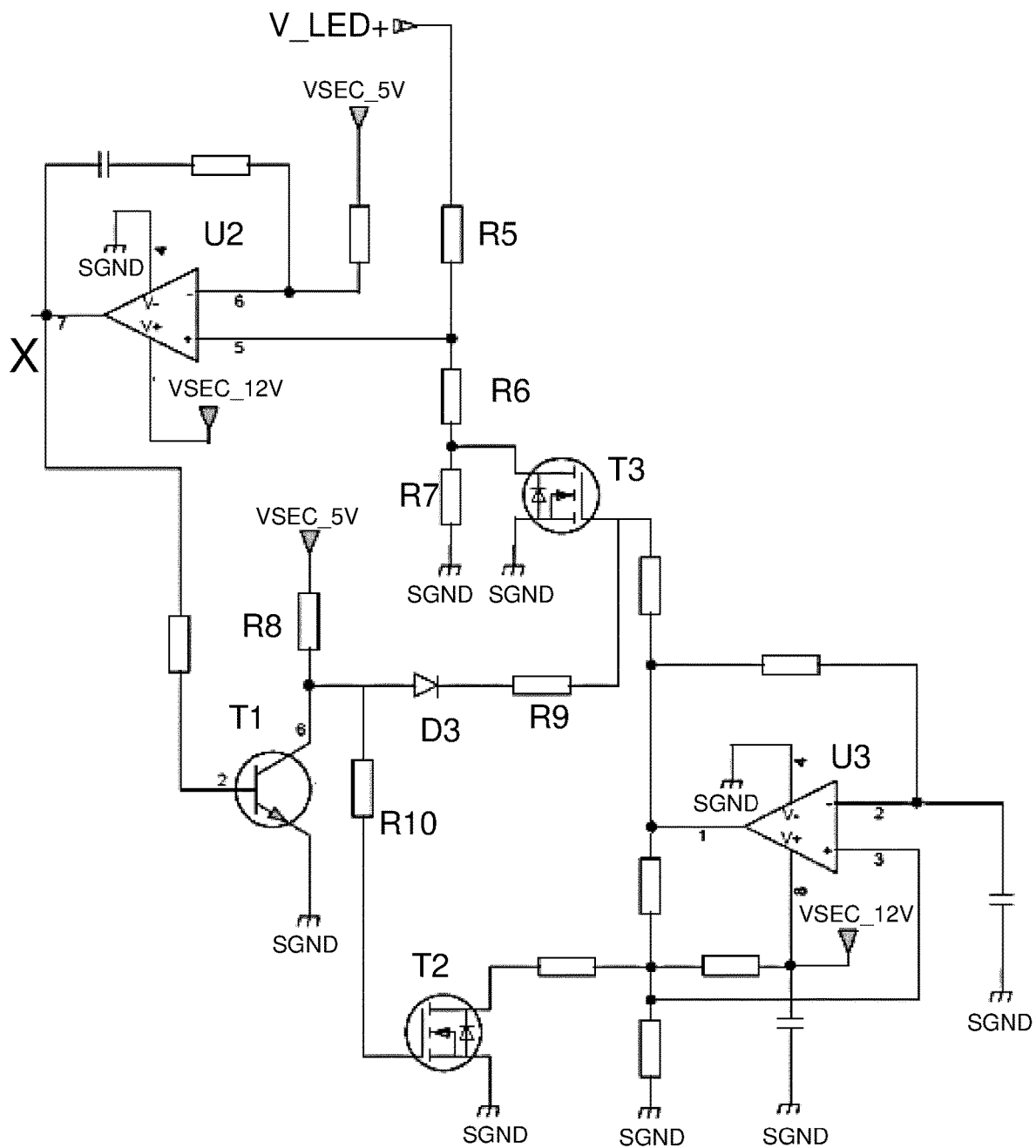

FIGS. 1A and 1B show a lighting circuit in accordance with one example of the invention. FIGS. 1A and 1B are connected by the node X, and also by the LED voltage V_LED+.

FIG. 1A shows a lamp load LED and a first part of the lamp driver, comprising a primary side circuit PSC shown to the left of the isolation and a secondary side circuit SSC to the left of the isolation, hence isolated from the primary side circuit. The primary side circuit has a ground connection GND, for example connected to via a safety capacitor to the luminaire, and the secondary side circuit has a virtual secondary side ground SGND.

An isolated driver circuit has a primary side DP and a secondary side DS. Any suitable driver topology may be used. The isolation is formed by a transformer.

Here the term "isolated" and hence "isolator" or "electrical isolator" means any means that prevents a direct electrical power-level transfer. An electrical isolator for example is a transformer, in which the power is transferred in a transition between an electric field and a magnetic field and between the magnetic field and an electric field. The isolated driver is, for example, a transformer-based switch mode power converter, such as a flyback converter, boost-integrated flyback (BiFRED) converter, an LLC or LCC converter, etc., in which the driver output cannot access the input electrical power directly. The input is instead connected to a primary winding of a transformer and the output is connected to a secondary winding of a transformer, and the two windings are only magnetically coupled for power-level electrical coupling.

The driver has a current regulation mode in which the switching is controlled to deliver a desired output current (for example corresponding to a desired lamp brightness) and a voltage regulation mode (for example as a safety mode).

The driver also has a primary side means of measuring the output voltage at the secondary side. The secondary side voltage is for example measured by an auxiliary winding, which gives a reflected voltage of the secondary side to the primary side. Another way is to measure the switching frequency in the case of an LLC converter. When the current setting is known as well as the frequency, the secondary side voltage can be calculated, using software and a micro controller. These methods are not very accurate and hence are not suitable for accurate measurement of the secondary side voltage.

The driver delivers an output voltage V_LED+ and an output current I_LED to the lamp load LED. An isolating feedback unit OP_ISOL is for providing a feedback signal from the secondary side circuit to the primary side circuit.

FIG. 1A shows a current regulating circuit of the secondary side circuit for generating the feedback signal based on a sensed output current I_LED, for use by the isolated driver when in the current regulation mode.

The current regulating circuit comprises a current sensor in the form of a sense resistor Rsense connected in series with the lamp load LED. Thus, a voltage across the sense resistor represents the output current.

The measured voltage is provided to a comparator U1 through a low pass filter R1, C1. The comparator has an input resistor R2 and a negative feedback resistor R3 thereby defining a gain of the comparator.

The measured voltage representing the current is provided to the inverting terminal of the comparator U1. The non-inverting terminal is provided with a reference voltage V(I_LEDtarget) representing a target current, through a resistor and capacitor scaling and filter circuit, and through an input resistor R4.

Thus, a deviation from a target current is provided as a feedback signal, while the overvoltage protection signal is not needed.

The output of the comparator U1 defines the feedback signal. The node X plays no role during normal current regulation. Thus, the normal operation of the circuit is understood from FIG. 1A.

FIG. 1B shows further components of the secondary side circuit.

An overvoltage protection circuit is provided for detecting an overvoltage condition of the output voltage V_LED+ and adapting the feedback signal to provide voltage control during the overvoltage condition.

The overvoltage protection circuit comprises a resistive divider R5, R6, R7 connected to the output voltage V_LED+. The voltage at a first tap, between R5 and R6, is provided to an overvoltage comparator U2 for comparing this output of the resistive divider with a reference voltage representing a maximum output voltage. This reference voltage is shown as a 5V voltage source VSEC_5V. The scaling of the resistive divider means the 5V reference is a suitable value to represent a maximum output voltage. Thus, a scaled version of the output voltage is compared with a reference voltage, to determine if the output voltage has reached a maximum voltage level.

If the reference voltage is not reached at the non-inverting input of the comparator U2, the output, which is connected to node X, will stay low and node X plays no role in the operation of the circuit of FIG. 1A as explained above. For example, the diodes D1, D2 prevent any injection of a bias current.

If the reference voltage is reached at the non-inverting input of the comparator U2, the output, which is connected to node X, will go high. A bias current is then injected through diodes D1 and D2 to the inverting terminal of the comparator U1. The driver interprets the reduced voltage at the output of the comparator U1 as a demand for reduced current.

In particular, the increase of the signal at Node X results in a reduced voltage drop across resistors R1 and R2 and this will reduce the voltage across the sense resistor and reduce the LED current. When there is a total open load the signal at Node X will increase until the LED current is zero.

During this time, the output voltage is regulated to a level which is dependent on the comparison result of the overvoltage protection circuit. In particular, the voltage is regulated so that the voltage sensed by the resistive divider R5, R6, R7 matches the reference voltage. Thus, a voltage limiting function is implemented using the same feedback control at the primary side.

In the DALI standard, there is a request to indicate that the driver is in the over voltage protection mode. Sometimes, this is also requested by the requirements of the driver.

Since the DALI micro controller is placed at the primary side of the driver, the indication of over voltage protection must also be at the primary side of the driver. The current and voltage regulation is situated at the secondary side of the driver, so there is no direct input to the micro controller indicative of the over voltage protection mode.

In accordance with the invention, modulation of the feedback signal during the overvoltage condition is used to modulate the resulting output voltage so that the overvoltage condition can more easily be detected at the primary side.

The overvoltage protection circuit further comprises a shorting switch T3 for selectively shorting a resistor R7 of the resistive divider, thereby changing an input to the overvoltage comparator circuit U2.

During the normal current regulation mode, T3 is turned on, by the 5V source VSEC_5V and the two resistors R8 and R9 and the diode D3.

FIG. 1B also shows a modulator circuit based on operational amplifier U3 for modulating the feedback signal during detection of the overvoltage condition. The modulator circuit in this example comprises a standard oscillator circuit based on resistors and capacitors defining positive and negative feedback paths.

During the normal current regulation mode with node X low, T1 is turned off, and T2 is turned on by the 5V source VSEC_5V and the two resistors R8 and R10. This pulls the non-inverting input of the operational amplifier U3 to ground and hence suppresses oscillation of the oscillator circuit. The output of the amplifier U3 remains low and the voltage at the gate of T3 is sufficient to maintain T3 turned on.

When the driver is in the voltage regulating mode, with node X at a high voltage, the transistor T1 conducts. This pulls the gate of T2 to ground, and it turns off. The diode D3 isolates the transistor T3 from the circuit other than the output of the oscillator.

The modulator, i.e. the oscillator circuit, is then turned on as it is no longer suppressed by the transistor T2. The shorting switch T3 is then controlled by the modulator. By shorting a resistor in the resistive divider, the output voltage of the resistive divider is changed, and hence the feedback signal is altered.

The voltage regulation function thus results in a different controlled value of the output voltage V_LED+.

When T3 is on, the voltage provided to the comparator U2 is high and when T3 is off, the voltage provided to the comparator is low. The voltage at node X thus has a modulation. This modulation causes the voltage regulation function to modulate the output voltage V_LED+. In particular, the modulation signal provides a modulated bias signal to an input of the current regulating comparator U1. This results in a modulated output voltage, corresponding to the change in the configuration of the resistive divider.

The modulated output voltage is then recognized at the primary side as an indication of the overvoltage mode.

The lamp driver thus generates a single feedback signal which can be used for normal current regulation or can be used to modulate the output voltage during voltage regulation, to indicate an overvoltage condition. The output voltage thus enables the primary side circuit to distinguish more clearly between the normal current regulation and the overvoltage protection.

The isolated driver circuit for example comprises DALI driver and the overvoltage protection circuit is for example for detecting an open circuit lamp load.

Figure 2:
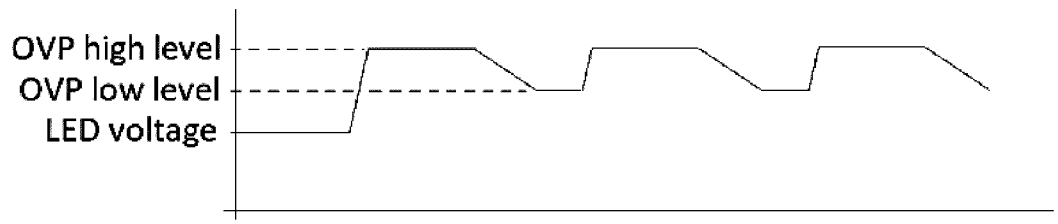
FIG. 2 shows an example of a modulation applied to the output voltage.

FIG. 2 shows the output voltage V_LED+ initially during normal current regulation and then when the modulated feedback signal is provided during overvoltage protection. The output voltage V_LED+ for example oscillates between OVP low e.g. 40V and OVP high e.g. 60V as a result of the voltage regulation function being fed with a different feedback control signal.

The oscillation period is adapted to be larger than the discharge time constant formed by the output buffer capacitor and power consumption of the small signal circuitry. Thus, the modulated output voltage is able to settle at the two levels before switching between them.

This modulation can be easily seen on the non-isolated/primary side by minimum and maximum detection of the micro-controller to process this information for the DALI interface.

The invention addresses the issue that on the primary side of an isolated LED driver the output voltage cannot be detected accurately enough to distinguish between open load (e.g. lamp failure) and rated operation with a high LED voltage. The voltage modulation of the output voltage is easily detected by a primary side output voltage measurement means and easily evaluated e.g. by a primary side micro-controller as a lamp failure mode.

The distinction between rated operation and failure mode is now made possible even with a relatively inaccurate primary output voltage measurement because the two levels may clearly differ.

Figure 3:
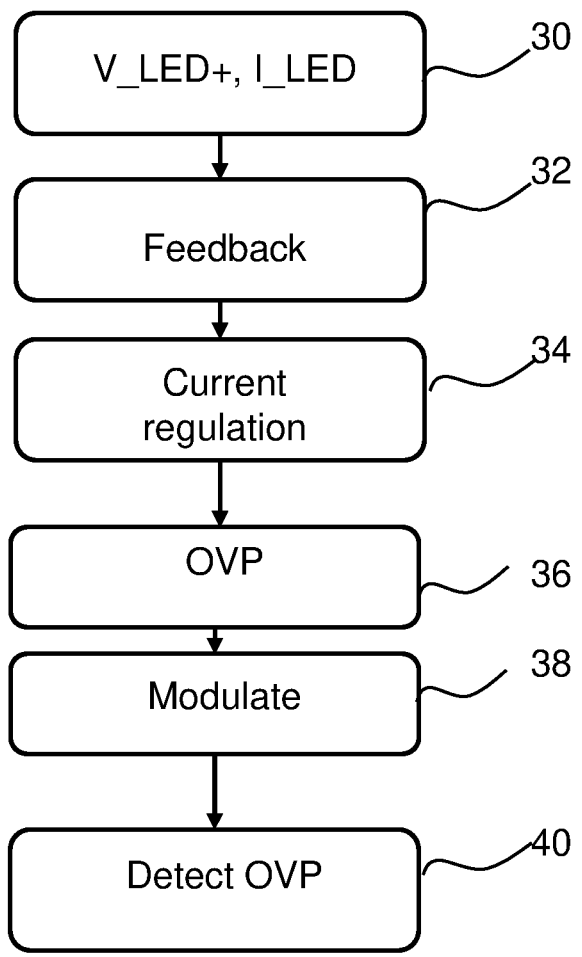
FIG. 3 shows a lamp driving method.

FIG. 3 shows a lamp driving method comprising:
in step 30, delivering an output voltage V_LED+ and output current I_LED to a lamp load using a secondary side circuit:
in step 32, providing a feedback signal from the secondary side circuit to a primary side circuit; and
in step 34 performing current regulation by providing a feedback signal from the secondary side circuit to the primary side circuit based on a sensed output current.
In step 36 there is detection if there is an overvoltage condition of the output voltage. If there is an overvoltage condition the feedback signal is modulated during detection of the overvoltage condition in step 38.

This modulation of the feedback signal results in a modulated output voltage because of the voltage regulation function of the driver. In step 40, the overvoltage condition is recognized at the primary side based on a modulation of the output voltage during the overvoltage protection mode.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lamp driver comprising:
a primary side circuit;
a secondary side circuit isolated from the primary side circuit for delivering an output voltage and output current to an LED lamp load; and
an isolating feedback unit for providing a feedback signal from the secondary side circuit to the primary side circuit;
an isolated driver circuit in the form of a transformer-based switch mode power converter, the isolated driver circuit comprising:
a primary side in the primary side circuit, a secondary side in the secondary side circuit and having a current regulation mode and a voltage regulation mode,
wherein the secondary side circuit comprises:
a current regulating circuit comprising a current sensor for sensing the output current wherein the current regulating circuit is for providing the feedback signal based on the sensed output current;
an overvoltage protection circuit for detecting an overvoltage condition of the output voltage and arranged to adapt the feedback signal to provide voltage control during the overvoltage condition; and
a modulator for modulating the feedback signal during detection of the overvoltage condition,
wherein the primary side circuit comprises:
a controller which is adapted to recognize the overvoltage condition based on a modulation of the output voltage during an overvoltage protection mode,
wherein the overvoltage protection circuit comprises a resistive divider connected to the output voltage and an overvoltage comparator circuit for comparing an output of the resistive divider with a reference voltage representing a maximum output voltage, and
wherein the overvoltage protection circuit comprises a shorting switch for selectively shorting a resistor of the resistive divider, thereby changing an input to the overvoltage comparator circuit, wherein the shorting switch is controlled by the modulator.

2. The lamp driver according to claim 1, wherein the modulator comprises an oscillator circuit.

3. The lamp driver according to claim 2, wherein the oscillator circuit comprises an operational amplifier oscillator circuit.

4. The lamp driver according to claim 1, wherein the current regulating circuit comprises a current sense resistor for connection in series with the LED lamp load, and a current regulating comparator circuit for comparing a voltage derived from the current sense resistor voltage with a reference voltage representing a target current.

5. The lamp driver according to claim 1, wherein the isolated driver circuit comprises a DALI driver.

6. The lamp driver according to claim 1, wherein the overvoltage protection circuit is for detecting an open circuit LED lamp load.

7. A lighting system comprising:
the lamp driver according to claim 1; and
an LED arrangement which comprises the LED lamp load.

8. The lighting system according to claim 7 incorporated in a luminaire.

9. A lamp driver comprising:
a primary side circuit;
a secondary side circuit isolated from the primary side circuit for delivering an output voltage and output current to an LED lamp load; and an isolating feedback unit for providing a feedback signal from the secondary side circuit to the primary side circuit;

an isolated driver circuit in the form of a transformer-based switch mode power converter, the isolated driver circuit comprising:
a primary side in the primary side circuit, a secondary side in the secondary side circuit and having a current regulation mode and a voltage regulation mode, wherein the secondary side circuit comprises:
a current regulating circuit comprising a current sensor for sensing the output current wherein the current regulating circuit is for providing the feedback signal based on the sensed output current;
an overvoltage protection circuit for detecting an overvoltage condition of the output voltage and arranged to adapt the feedback signal to provide voltage control during the overvoltage condition; and
a modulator for modulating the feedback signal during detection of the overvoltage condition, wherein the primary side circuit comprises:
a controller which is adapted to recognize the overvoltage condition based on a modulation of the output voltage during an overvoltage protection mode, wherein the current regulating circuit comprises a current sense resistor for connection in series with the LED lamp load, and a current regulating comparator circuit for comparing a voltage derived from the current sense resistor voltage with a reference voltage representing a target current, and wherein the overvoltage protection circuit is configured to adapt the feedback signal by providing a bias signal to an input of the current regulating comparator circuit.

10. The lamp driver according to claim 9, wherein the bias signal is modulated by the modulator.

11. The lamp driver according to claim 9, wherein the modulator comprises an oscillator circuit.

12. The lamp driver according to claim 11, wherein the oscillator circuit comprises an operational amplifier oscillator circuit.

13. The lamp driver according to claim 9, wherein the overvoltage protection circuit comprises a resistive divider connected to the output voltage and an overvoltage comparator circuit for comparing an output of the resistive divider with a reference voltage representing a maximum output voltage.

14. The lamp driver according to claim 13, wherein the overvoltage protection circuit comprises a shorting switch for selectively shorting a resistor of the resistive divider, thereby changing an input to the overvoltage comparator circuit, wherein the shorting switch is controlled by the modulator.

15. The lamp driver according to claim 9, wherein the isolated driver circuit comprises a DALI driver.

16. The lamp driver according to claim 9, wherein the overvoltage protection circuit is for detecting an open circuit LED lamp load.

17. A lighting system comprising:
the lamp driver according to claim 9; and
an LED arrangement which comprises the LED lamp load.

18. The lighting system according to claim 17 incorporated in a luminaire.

19. A lamp driving method comprising:
delivering an output voltage and output current to an LED lamp load using a secondary side circuit;
providing a feedback signal from the secondary side circuit to a primary side circuit;
performing current regulation by providing a feedback signal from the secondary side circuit to the primary side circuit based on a sensed output current; and
detecting if there is an overvoltage condition of the output voltage and if there is the overvoltage condition modulating the feedback signal during detection of the overvoltage condition; and
recognizing the overvoltage condition at the primary side based on a modulation of the output voltage during the overvoltage protection mode;
wherein detecting the overvoltage condition comprises comparing an output of a resistive divider connected to the output voltage with a reference voltage representing a maximum output voltage, and wherein the modulating comprises selectively shorting a resistor of the resistive divider.

20. The method according to claim 19, wherein performing current regulation comprises comparing a voltage representing the output current with a reference voltage representing a target current and wherein adapting the feedback signal comprises providing a bias signal when comparing the voltage representing the output current.

* * * * *